United States Patent [19]

Randolph et al.

[11] 4,059,889

[45] Nov. 29, 1977

[54] QUILTING MACHINE

[75] Inventors: Arthur J. Randolph, Santa Rosa; Richard M. Boyce, Windsor, both of Calif.

[73] Assignee: Arthur J. Randolph, Santa Rosa, Calif.

[21] Appl. No.: 748,132

[22] Filed: Dec. 6, 1976

Related U.S. Application Data

[63] Continuation-in-part of Ser. No. 616,199, Sept. 24, 1975, Pat. No. 3,995,359.

[51] Int. Cl.[2] .............................................. B23Q 7/10

[52] U.S. Cl. ....................................... 29/706; 29/709; 29/789; 29/809; 29/823

[58] Field of Search ................. 29/706, 709, 717, 718, 29/771, 786, 787, 788, 789, 790, 798, 809, 818, 823; 227/116, 60, 58, 59

[56] References Cited

U.S. PATENT DOCUMENTS

| | | | |
|---|---|---|---|
| 2,878,556 | 3/1959 | Heidergott et al. | 29/718 |
| 3,081,885 | 3/1963 | Carlzen et al. | 29/809 X |
| 3,266,132 | 8/1966 | Wideburg et al. | 29/717 X |
| 3,501,826 | 3/1970 | Marcus | 29/718 X |
| 3,588,995 | 6/1971 | Schoepe et al. | 29/788 X |

*Primary Examiner*—Victor A. DiPalma

*Attorney, Agent, or Firm*—Alvin E. Hendricson

[57] ABSTRACT

A machine for inserting quilting buttons of the type described in U.S. Pat. No. 3,701,174 includes a male button drive mechanism and a female button drive mechanism in axial alignment with positive and rapid acting button feed means for very rapidly driving a female button part through a pad or the like and driving the male button part into the female button part so as to secure the quilting button in extension through such a pad. The invention is particularly directed to very rapid quilting operations.

6 Claims, 9 Drawing Figures

QUILTING MACHINE

The present invention is a continuation-in-part of Ser. No. 616,199, filed Sept. 24, 1975, now U.S. Pat. No. 3,995,359 entitled "Quilting Machine".

BACKGROUND OF THE INVENTION

The general background of quilting operations is set forth in the above-noted patents and is thus generally applicable to the present invention. The rapidity with which quilting operations may be performed is of substantial importance in the commercial application of quilting operations. The present invention is particularly directed to the extremely rapid insertion and locking together of the above-noted quilting buttons, particularly in the manufacture of chair pads, lounge pads and the like, wherein the pad to be quilted is of a size so as to be readily easily handled. By the simplification of button part drive means and button holding means, the present invention materially decreases the time required to perform successive individual quilting operations. Location of the pad to be quilted for successive operations is left to the operator who physically moves the pad into approximately correct position for each button insertion. The present invention is capable of driving and securing a quilting button in a period of the order of one second and in operation the present invention has been employed to perform a substantial number of successive quilting operations upon a plurality of successive pads or quilts at a rate of about six seconds each.

SUMMARY OF INVENTION

The present invention comprises a machine for automatically inserting male and female parts of a quilting button through a pad or cushion so that the parts lock together and thus quilt the pad. The quilting button employed by the present invention is shown and described in U.S. Pat. No. 3,701,174 and the machine hereof comprises means for feeding female button parts successively onto a vertically movable member carrying a reciprocating needle which is driven through the female button part to extend the point thereof from the small open end thereof. The female button part with the needle extending therethrough is then driven through a quilt, pad or the like, having a covering about a resiliently compressible central material. Male button parts of the quilting button are successively fed into a male button holder including movable parts such that the male button part may be driven therethrough by drive means so as to force the shank of the male button part into the female button part as the needle therein is retracted. An apertured guard or the like is provided beneath the male button holder so that the pad to be quilted is restrained as the female button part is driven therethrough.

The present invention is automated to operate as, for example, pneumatically through a sequence of operations and in fact to repeat such sequence whereby an operator of the machine hereof may move a pad to be quilted about on an apertured table to align desired portions with the quilting buttons which are then driven therethrough and locked together. Very rapid insertion and locking of quilting buttons is possible in accordance with the present invention to thus command this invention to widespread commercial applicability.

DESCRIPTION OF FIGURES

The present invention is illustrated as to a single preferred embodiment thereof in the accompanying drawings wherein:

FIG. 8 is a vertical sectional view of a quilting button as employed in the present invention fully inserted in a pad or the like.

DESCRIPTION OF PREFERRED EMBODIMENT

Figure 8:
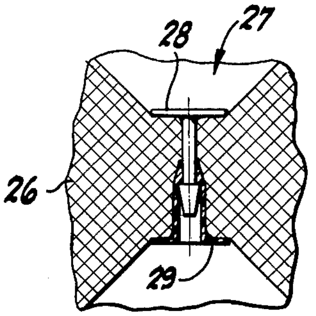

The present invention provides a simplified mechanism for the insertion of quilting buttons of the type disclosed in U.S. Pat. No. 3,701,174 into a pad or quilt. A preferred embodiment of the improved quilting machine hereof includes a frame 21 which may be formed of a pair of side plates 22 and 23 suitably secured together in spaced relationship and having a central opening extending laterally therein from one side to accommodate mounting of a fixed working surface or table 24 upon which a pad or the like 26 may be disposed and moved about in order to be quilted by the machine hereof. The quilting button 27 employed by the present invention and illustrated in FIG. 8 includes a male button portion 28 having a flanged head with a depending shank and an enlarged tapered end on the shank. The button 27 also includes a female button portion 29 including a hollow cylindrical upstanding portion with a flanged bottom and an internal shoulder adapted to be engaged by the enlarged end of the male button portion shank. The female button portion has a limited flexibility so that the male button portion may be driven therein to lock the button portions together as illustrated in FIG. 8.

The improved quilting machine hereof includes an upper button drive means 31 adapted to receive male button portions from an upper feed mechanism 32 which may be mounted atop the frame 21 and which has a track 33 extending therefrom to a male button holder 34 immediately beneath the upper drive mechanism 31. Lower drive means 36 are disposed beneath the table 24 in the frame 21 and a lower feed mechanism 37 feeds female button parts 29 into a female button holder 38 along a track 39.

Figure 1:
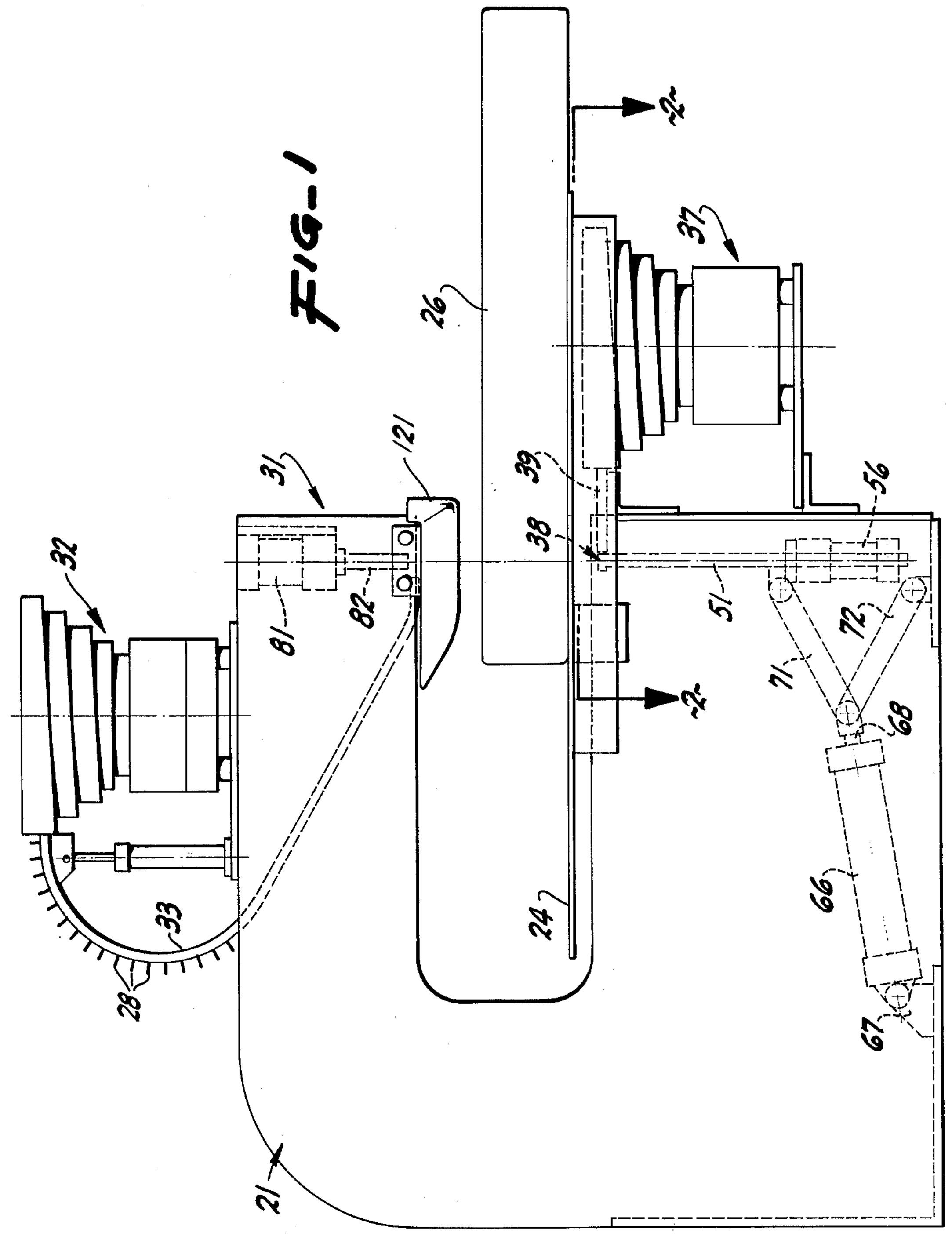
FIG. 1 is a side elevational view of the machine or the present invention.
Figure 2:
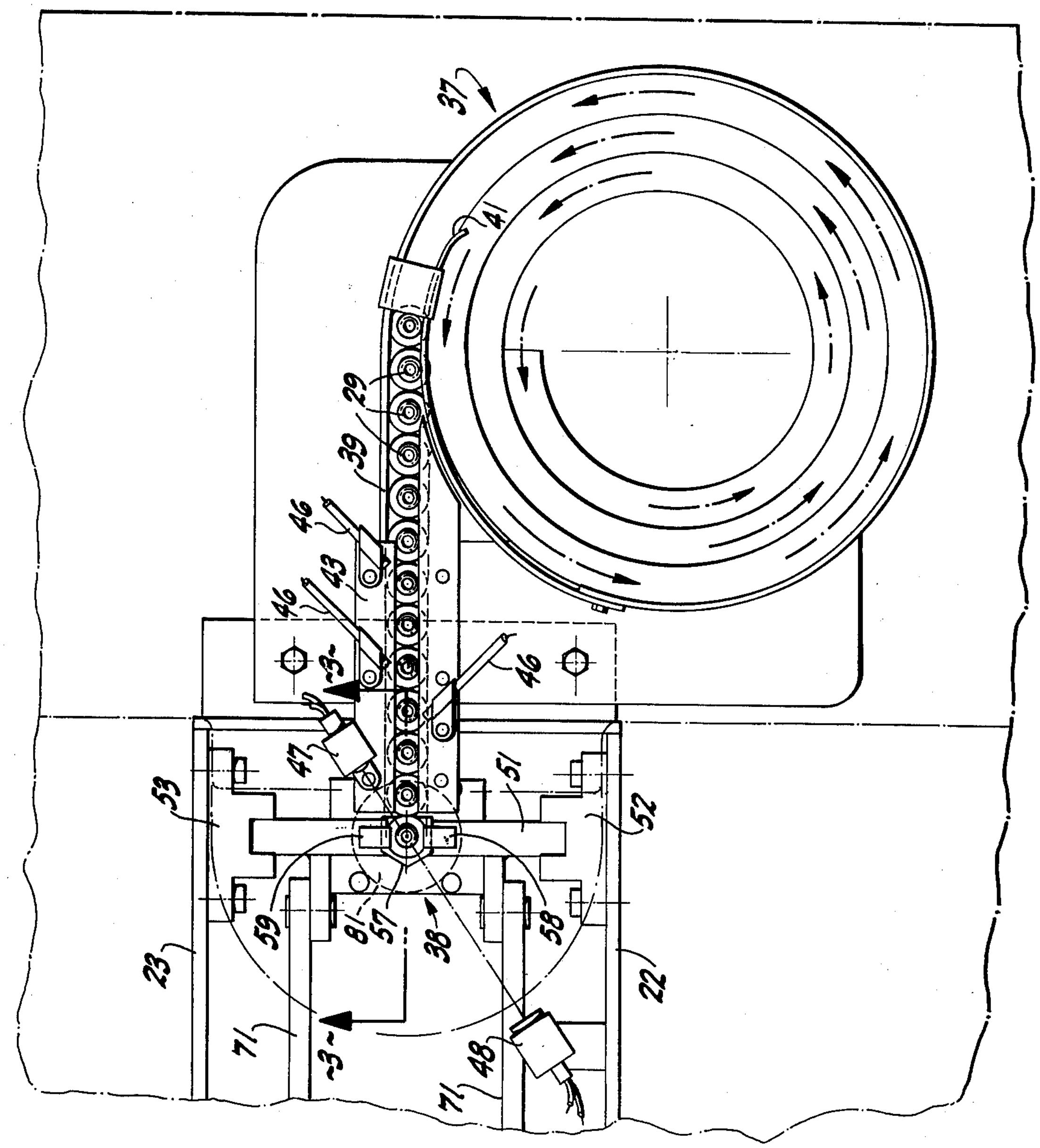
FIG. 2 is a horizontal sectional view taken in the plane 2—2 of FIG. 1 and showing the lower feed mechanism of the present invention.

The present invention operates to automatically feed male and female button portions into positions above and below a pad or the like to be quilted, to drive the female button portion through the pad and to drive the male button portion through the female button portion to thus lock the quilting button in quilted position through the pad. Considering first the lower feed mechanism 37, it is noted that same includes a female button part dispenser, such as an ultrasonic feeder including a vibration generator and feeder bowl having a spiral ledge extending upwardly about the interior thereof. Female button parts disposed in quantity in the bowl move individually along the ledge upwardly to the track 39. It will be appreciated that the female button parts may move along the ledge either in an upright position as desired or possibly may lie on their side during this movement and a small finger or the like 41 is provided to engage any female button part lying on its side and push it from the ledge so that only upright button parts enter the track 39. This track 39 may be formed as an elongated trough having a lower plate 42 mounted on the frame 21, as illustrated for example in FIG. 3, and upstanding sides to limit button movement longitudinally of the track. The lower feed means 37 are also preferably mounted on the frame as illustrated, for example, in FIG. 1 and a pair of spaced apart guide plates overlie the track 39 at the exit end thereof, as shown in FIG. 2. These plates may be suitably mounted upon the frame and will be seen to overlie the lower flanged portion of the female button parts as the latter move along the track. As noted above, the present invention is particularly adapted for extremely rapid application of quilting buttons and, in order to ensure appropriate positioning of the female button parts, it is herein provided that a number of small air jets 45 shall be mounted, for example, upon the guide plates 43 and 44 to direct jets of air against the button parts moving along the track in order to urge the parts into contiguous relation as they approach the exit end of the track. There is additionally provided herein a means for ensuring proper positioning and location of a female button part in the female button holder 38 prior to each quilting operation and such means are shown in FIG. 2 to include a small light source 47 mounted on the guide plate 43, for example, and directing a pencil beam of light through the proper female button location in the button holder 38 to a photo sensor 48 mounted, for example, on the side plate 22. Operation of this sensing means is further discussed below in connection with the control system hereof.

Figure 5:
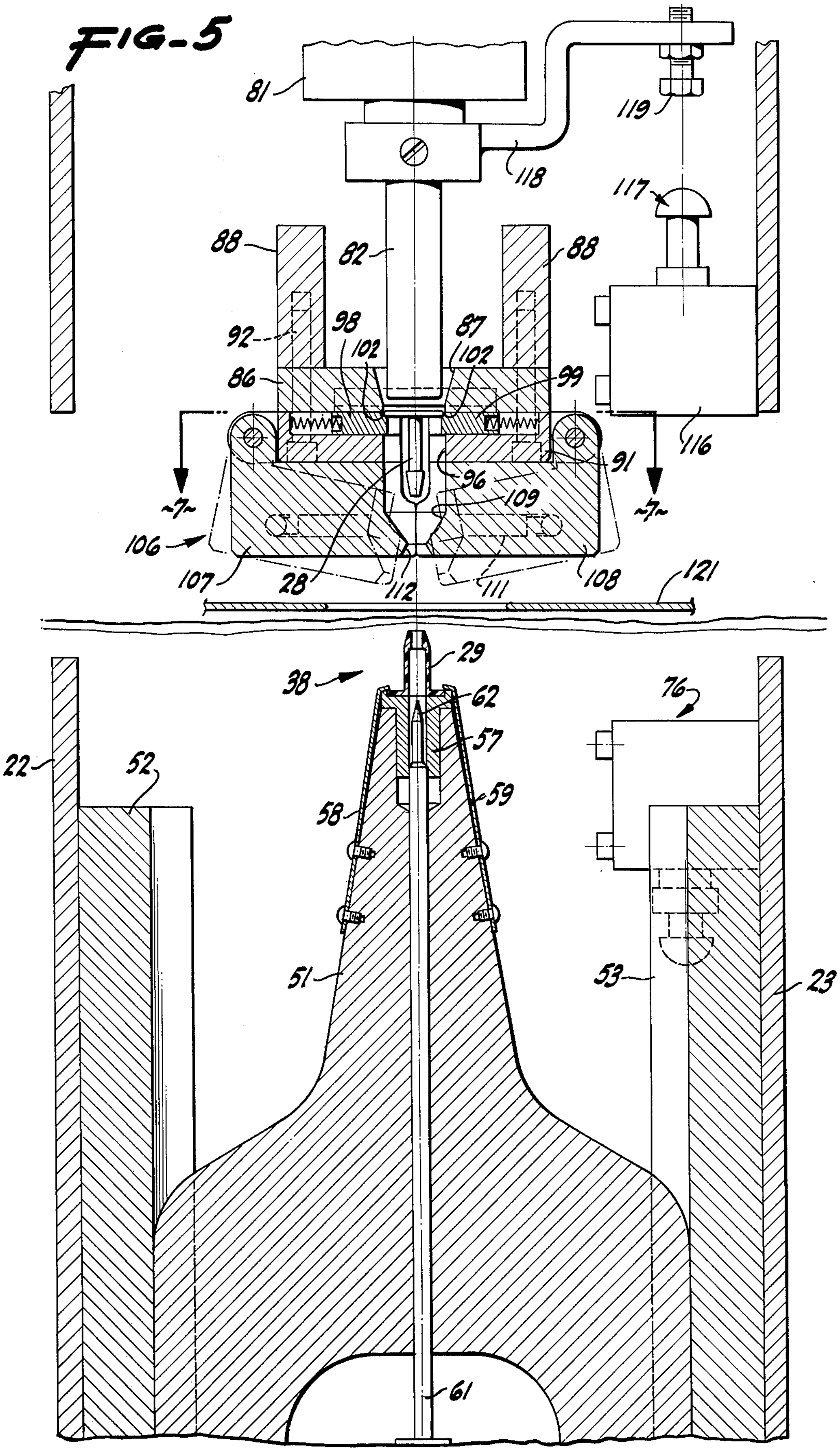
FIG. 5 is an enlarged central vertical sectional view taken in the plane 5—5 of FIG. 3 and showing details of button part holding mechanisms prior to button insertion during a quilting operation.

The lower drive means 36 operates to drive a female quilting button upwardly through an opening 49 in the table 24 and thence through a pad or the like 26 disposed on this table. These drive means include a slide plate 51 disposed for vertical movement along a pair of parallel vertical tracks 52 and 53 mounted, for example, upon the inner sides of the side plates 22 and 23. A drive cylinder 56 is secured in a central slot in the lower portion of the slide plate 51 for vertical movement therewith. The slide plate 51 is tapered inwardly toward the upper end thereof and is apertured to receive an insert 57 having a depression in the upper surface thereof with the far side thereof with respect to the track 39 formed as a semicircle of the same diameter as the female button portion flange. As best shown in FIG. 5, the female button portion 29 moves from the track 39 into the recessed top of the insert 57 on the slide plate 51 and a pair of spring clips 58 and 59 overlie the recess into which the female button portion slides so as to firmly but releasably retain a female button portion in vertical disposition atop the slide plate 51. The drive cylinder 56 has an upwardly extending piston rod or extension 61 thereof disposed in a vertical bore through the slide plate 51 with a drive needle 62 secured to the top of the extension 61. The insert 57 is centrally apertured so that this needle 62 may be driven upwardly through the female button portion 29 by operation of the drive cylinder 56.

Figure 4:
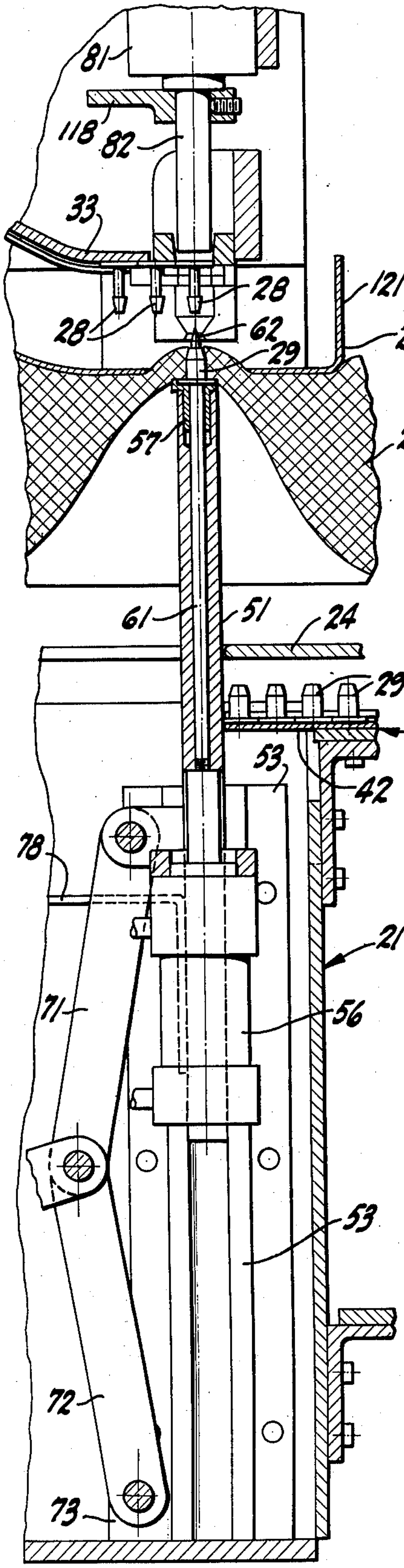
FIG. 4 is a central vertical sectional view taken in the same plane as FIG. 3 and showing the lower drive mechanism after actuation thereof.
Figure 3:
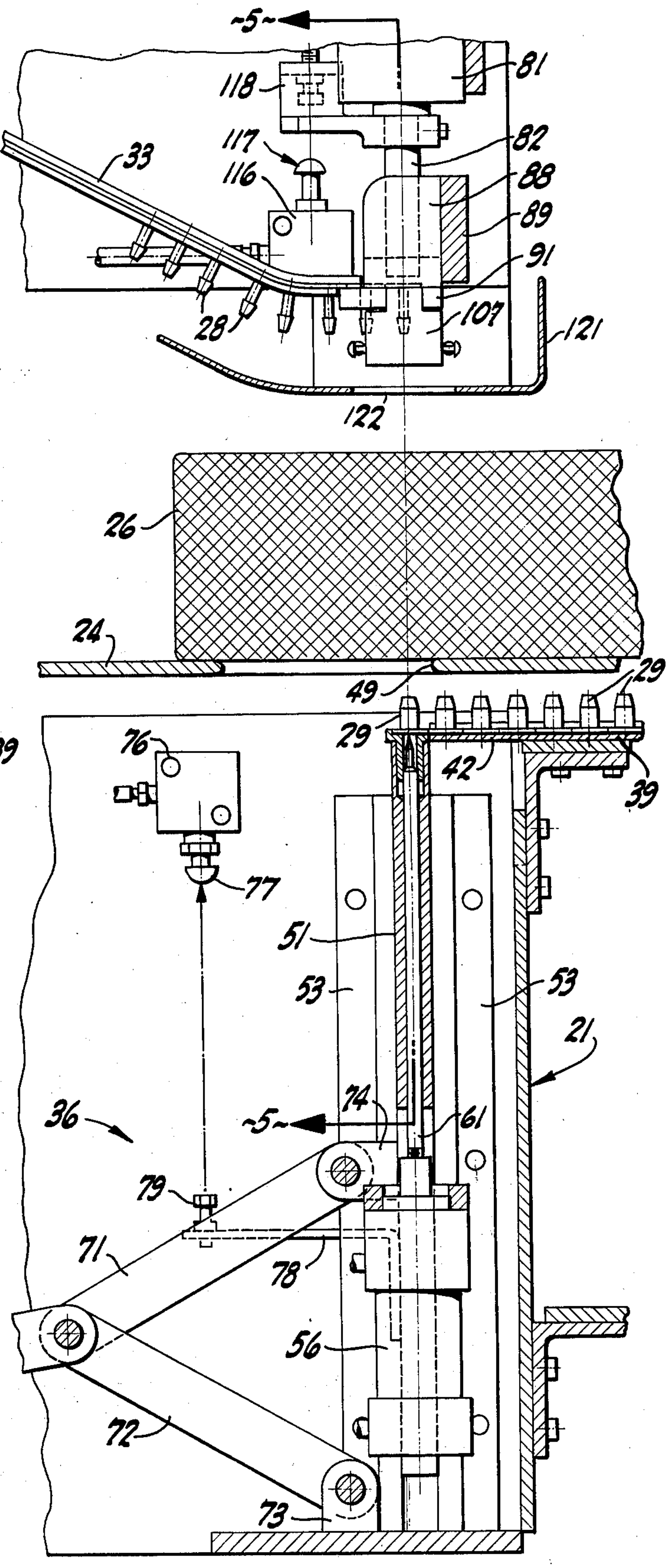
FIG. 3 is a central vertical sectional view taken in the plane 3—3 of FIG. 2 and illustrating the upper and lower drive mechanisms prior to actuation for insertion of a quilting button.

The lower drive mechanism further includes a pneumatic or hydraulic cylinder 66 pivotally mounted at one end on a bracket 67 in the frame 21 and having a piston rod 68 extending from the other end of the cylinder into pivotal engagement with a pair of drive links 71 and 72. The lower link 72 is pivotally mounted on a bracket 73 secured to the frame 21 and the upper link 71 is pivotally mounted on a bracket 74 extending laterally from the slide plate 51. It will be seen that operation of the hydraulic or pneumatic cylinder 66 to force the piston rod 68 outwardly therefrom will thus drive the slide plate 51 vertically upward between the tracks 52 and 53. This movement of the drive linkage is illustrated in FIGS. 3 and 4 wherein FIG. 3 illustrates the slide plate 51 in retracted position and FIG. 4 illustrates the slide plate in upwardly driven position. This linkage system serves to provide an advantageous mechanical advantage in movement of the slide plate upwardly and forcing the female button portion through the pad 26.

Automatic control over the extent of upward movement of the slide plate 51 and female button portion 29 carried thereby is herein provided by pneumatic control switch 76 which is mounted in the frame 21 with an actuator button 77 depending therefrom in position to be engaged by an arm 78 secured to and extending laterally from the slide plate 51. At the outer end of the arm 78 there may be provided an adjustable extension 79 extending upwardly therefrom in order to initially adjust the vertical position of the slide plate 51 when the arm 78 engages the actuator 77 to terminate vertical movement of the slide plate. Additionally the actuator button 77 may incorporate adjusting means if desired.

The upper drive mechanism 31 operates to receive male button parts 28 from the feed means 32 along the track 33 and to drive the male button part through the female button part. The upper drive mechanism includes a pneumatic or hydraulic upper drive cylinder 81 mounted in the frame 21 and having a piston rod 82 extending downwardly therefrom in axial alignment with the piston rod or extension 61 of the lower drive cylinder 56. Male button parts are fed along the track 33 with the shank of each depending through a slot in the track and successively enter the male button holder 34 in position for the piston rod 82 to engage the head of the button part and to drive the male button part downwardly. The button holder 34 is illustrated in some detail in FIGS. 3 to 7 and includes a transverse plate 86 having a central tapered aperture 87 therethrough in alignment with the piston rod 82 with a pair of upright plates 88 secured thereto on opposite sides of the piston rod travel and in turn secured to a crossbar 89 mounted between the side plates 22 and 23 of the frame 21. A mounting plate 91 is secured contiguously beneath the plate 86 as by bolts 92 extending vertically through the mounting plate 91, the plate 86 and into the upright plates 88. The mounting plate 91 has a pair of rearward projections or ears 93 disposed on opposite sides of a lateral slot 94 extending vertically through the mounting plate from the rear thereof to a central circular opening 96 extending vertically through the mounting plate and having a diameter slightly larger than the diameter of the male button part head. The track 33 is inclined downwardly from the feed means 32 to the male button holder 34 and has the lower end thereof affixed to the ears or projections 93 on the mounting plate so that male button parts moving down the track will move inwardly of the mounting plate with the shank depending through the slot 94 and the head or top flange of the button part riding upon the ears 93.

Figure 7:
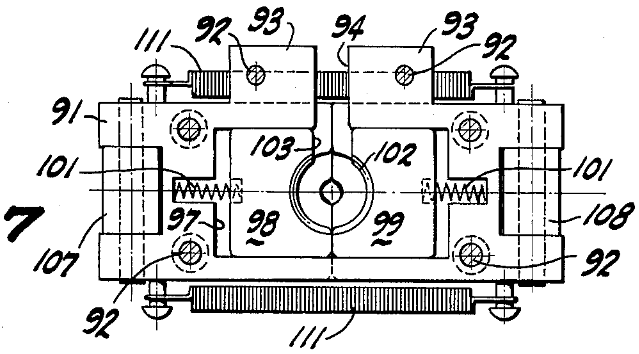
FIG. 7 is a transverse sectional view taken in the plane 7—7 of FIG. 5 and illustrating the male button receiving and holding mechanism.

The upper surface of the mounting plate 91 has a rectangular recess 97 formed therein and a pair of detent plates 98 and 99 are disposed in this recess. These detent plates are best illustrated in FIG. 7 wherein it will be seen that the combined length thereof is somewhat less than the length of the recess 97 with the small springs 101 being disposed in compression in small lateral cutouts in the mounting plate and extending into small end openings in the detent plates in order to force these plates together. The two plates 98 and 99 together define a central circular opening slightly smaller than the male button part head with an inclined or tapered upper edge 102 thereabout and a rear opening 103 therebetween aligned with the opening 94 in the mounting plate. Referring to FIG. 5 it will be seen that the tapered opening 87 in the plate 86 is preferably formed with vertical sides at the bottom of the opening and a recess in the under surface thereof extending to the ears 93 to accommodate movement of the head of a male button part into the mounting means from the track 33 with the depending shank of the button part moving through the slot 94 in the mounting plate and the slot 103 in the detent plates so that a button is then disposed as illustrated in FIG. 5 with the flanged head portion resting upon the tapered or inclined edge 102 of the detent plates. In this position a male button part may be forced downwardly from the button holder by engagement of the piston rod with the head of the male button part and moving the rod downwardly. This action causes the detent plates 98 and 99 to be moved outwardly by the force of the head of the button part on the inclined surface 102.

In addition to the foregoing portions of the button holder 34, there are also provided deflecting means 106 comprised as a pair of pivotally mounted jaws 107 and 108. Each of these jaws has an upstanding lug which is pinned between end extensions of the mounting plate 91 and together the jaws 107 and 108 define a central circular opening 109 vertically therethrough aligned with the opening 96 in the mounting plate, with a tapered restriction adjacent the lower end of the opening together with a lateral slot at the back side of the jaws aligned with the slot 94 in the mounting plate for accommodating passage of the male button part shank into central position in the male button holder 34. A pair of springs 111 are mounted between the jaws at the front and back thereof, as by engagement with pins extending from the jaws, in order to normally hold the jaws together in the position illustrated in FIG. 5. These springs supply only a limited force urging the jaws together so that the jaws may be pivoted apart by the head of a male button part as it is driven therethrough. The restriction 112 in the lower portion of the opening 109 defined by the deflection means 106 tapers from both ends, as illustrated in FIG. 5, for reasons further defined below in connection with the operation of the present invention.

Automatic control of the movement of the upper drive mechanism is provided by a pneumatic or hydraulic switch or the like 116 mounted within the frame adjacent the button holder 34. The switch 116 has an actuator 117 atop same, as shown in FIG. 5 for example, and an arm 118 secured to the piston rod 82 extends laterally therefrom into position for engaging this actuator button as by means of an adjustable extension 119 in the arm. There is additionally provided a guard 121 extending beneath the upper or male button holder 34, as generally illustrated in FIGS. 1 and 3 for example, and this guard has an opening 122 therethrough beneath the male button holder 34 of a sufficient size to limit deflection of the pad thereat. The quard 121 extends at least partially beneath the track 33 and also extends in front of the button holder 34 in order to prevent the pad 26 from being forced against these elements during quilting operations.

The button machine of the present invention may be powered electrically, hydraulically or pneumatically and in the present and following discussions it is assumed that pneumatic drive is utilized. It will also be appreciated that appropriate air lines are connected to the cylinders and switches of the present invention as described above and, furthermore, that the cylinders are controllably connected to a source of pressurized air. It is also noted that provision is made herein for initially adjusting various elements of the invention to ensure smooth rapid operation of the invention and proper accomplishment of all functions thereof.

The insertion of a quilting button through a pad or quilt is accomplished in accordance with the above-noted patent defining the button employed herein and the method of application. Mechanically the button is driven through the pad or the like much in the manner of U.S. Pat. No. 3,995,359; however, the present invention provides an economy of motion of mechanical parts and a particular rapidity of such motion whereby extremely rapid quilting operations may be performed. Considering now the steps in the operation of the present invention as illustrated in the drawings, it is noted that, after placing a quantity of male and female button parts in the upper and lower feed means 32 and 37, respectively, and energizing these means, the male button parts 28 will move along the track 23 to the male button holder 34 and female button parts will move along the track 39 to the female button holder 38. Because of the rapidity of operation capable with the present invention, it is necessary to ensure proper placement of button parts prior to initiation of the quilting operation and to this end particular provision is made for urging the female button parts 29 toward and into the female button holder 38. Means for this purpose are illustrated in FIG. 2 wherein the small air jets 46 are shown to be directing jets of air upon the button parts moving along the track 39 in order to ensure that the button parts are, in fact, in contiguous relationship as they approach the button holder 38. The gravity feed of the male button parts normally ensures contiguous relationship of button parts fed to the male button holder 34; however, it is also possible to provide means such as air jets or the like at this station of the present invention in order to make sure that the male button part is in proper position to be driven through the female button part during each quilting operation.

Figure 9:
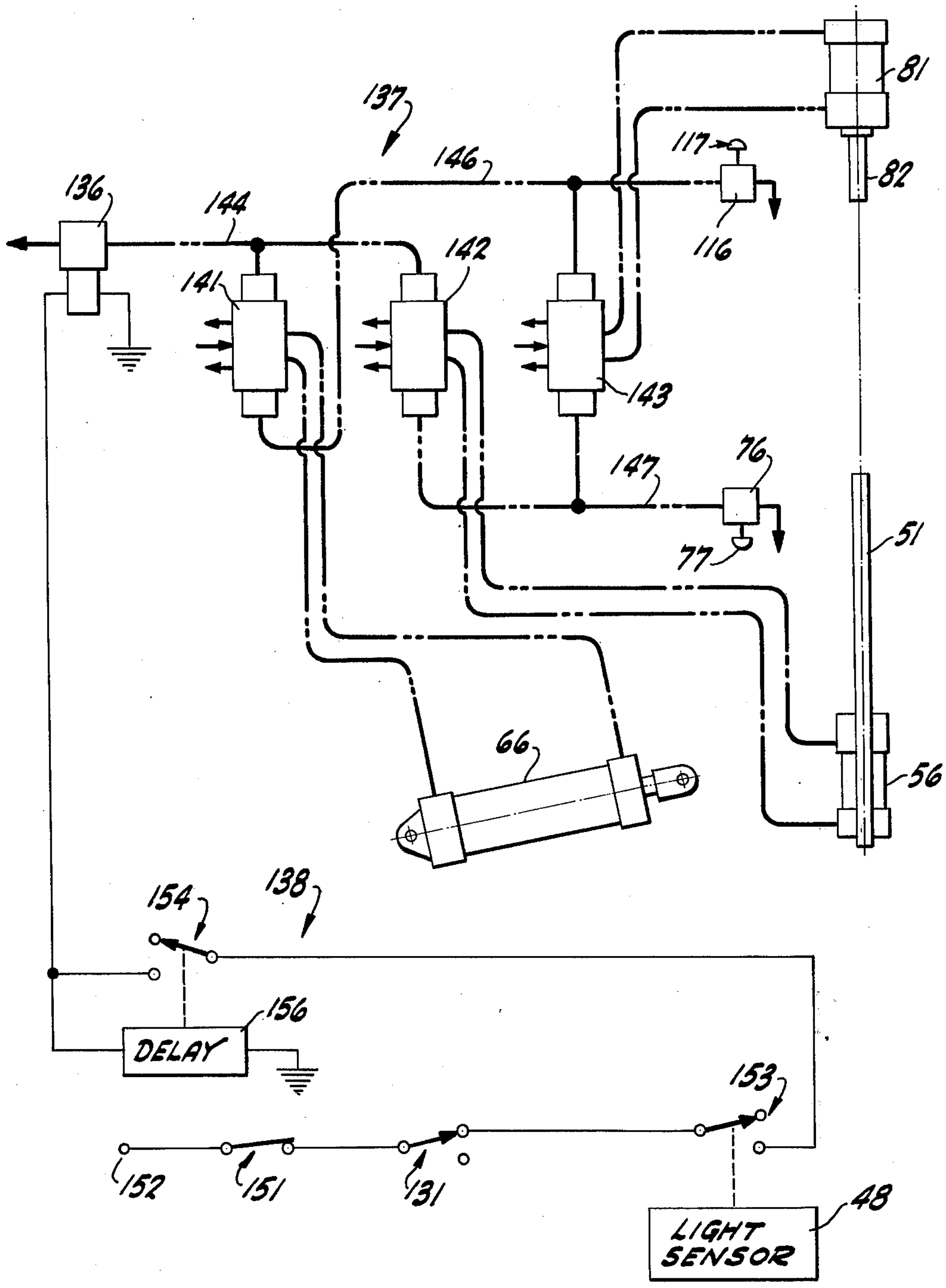
FIG. 9 is a schematic illustration of the control system of the present invention.

It is provided by the present invention that the machine hereof shall be actuated by a foot pedal or the like such as the foot pedal 131 of FIG. 9. Operation of a switch such as the foot pedal 131 serves to initiate automatic operation of the present invention after energization of the male and female button part feed means 32 and 37 so that male and female button parts are disposed at the male button holder 34 and female button holder 38, respectively. At the start of each button insertion or quilting operation the male and female button parts 28 and 29 are located in the invention hereof at the positions illustrated in FIGS. 3 and 5 of the drawings.

Figure 6:
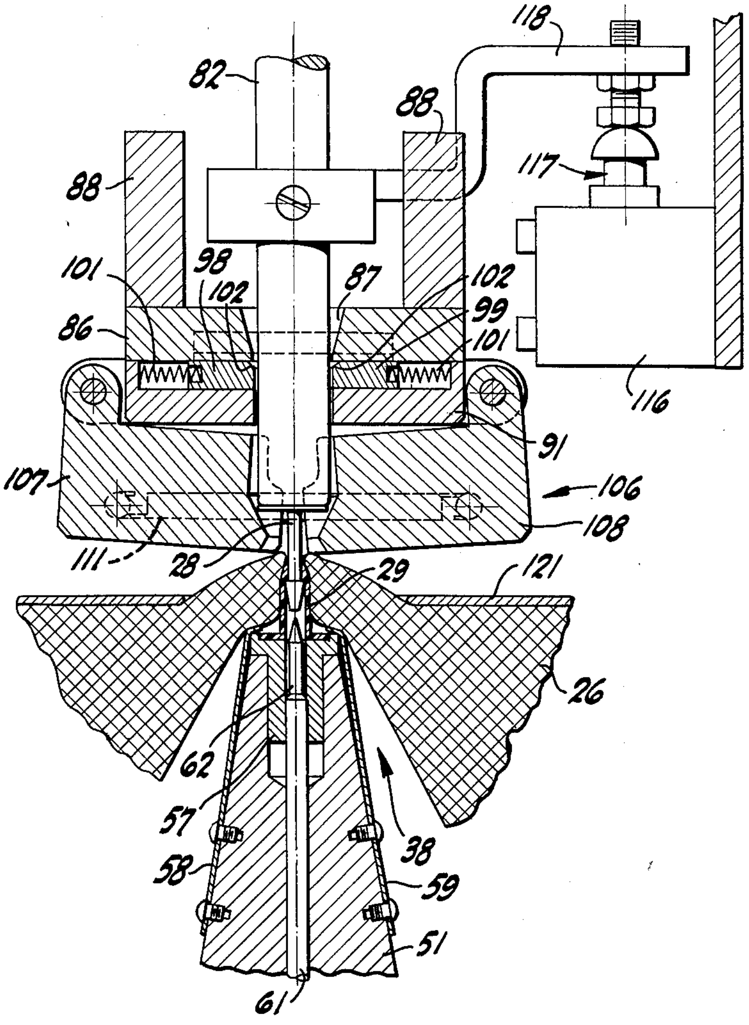
FIG. 6 is a sectional view taken in the same plane as FIG. 5 and showing button insertion during quilting operation.

With a female button part 29 disposed atop the slide plate 51 and retained thereat by the spring clips 58 and 59, as shown in FIG. 5, the drive cylinder 56 is actuated to move the needle 62 upwardly through the female button part and the cylinder 66 is then actuated to move the slide plate 51 upwardly and thus to drive the needle and female button part through the pad 26, as illustrated in FIG. 4. The cylinder 66 works through the linkage including links 71 and 72 to thus very forceably drive the needle through the pad 26. It will be appreciated that the pad 26 resting upon the table 24 will be deflected upwardly and compressed somewhat in the manner illustrated in FIG. 4 with the upper portion of the pad restrained by the guard 121 and at the point of female button insertion the pad is actually deflected through the opening 122 in the guard. At the termination of this upward movement of the slide plate 51 the upper drive cylinder 81 is actuated to cause the piston rod 82 to move downwardly and to force the male button part 28 between the spring loaded detent plates 98 and 99. As the male button part is moved downwardly the head of the male button part shank will pass through the restriction 112 which will be noted to have substantially the same diameter as this head. Any possible deviation of the male button part from purely axial travel will be corrected by engagement of the shank of the button part with the tapered portions of the jaws 107 and 108. As the male button part approaches the female button part the needle 62 is retracted by the cylinder 56 and the shank of the male button part is driven through the limitedly resilient upper portion of the female button part. An intermediate position of button parts is illustrated in FIG. 6. It will be seen that during the latter part of this drive the head or flange of the male button part also engages the tapered portions of the jaws 107 and 108 to thus limitedly pivot the deflector 106.

After the button parts have been forced together, operation of the upper drive cylinder 81 is reversed to withdraw or raise the piston rod 82 thereof and at the same time the cylinder 66 is reversed in operation to withdraw the piston rod 68 thereof and thus to lower the slide plate 51 whereby the quilted pad is released to resiliently return to normal position on the table 24. The slide plate 51 returns to original position, as shown in FIG. 3, and immediately the next female button part is forced onto the top thereof at the female button part holder 38 where it is grasped by the spring clips 58 and 59 so that another button insertion may be initiated. As soon as the piston rod 82 of the upper drive cylinder 81 is withdrawn from the male button holder 34, the next male button part moves into this male button holder into the position illustrated in FIG. 5, for example, and the cycle is ready for repetition. As soon as a quilting button is locked in position through the pad 26 and the upper and lower drive means retracted, the operator moves the pad on the table 24 to properly position it for insertion of the next quilting button. The present invention is preferably automatically operated to insert another button in the pad and the successive operations are caused to be completed in a very short period of time, as of the order of a very few seconds at the most.

The aforementioned automatic operation of the present invention may be controlled by a control system such as that illustrated in FIG. 9 of the drawings. In this figure mechanical elements previously described are identified by the same numbers as previously employed. The system of FIG. 9 includes a pneumatic switch 136 connected to controllably vent a pneumatic control system 137 in accordance with signals received from an electrical control system 138 operating the switch 136. The pneumatic control system includes three control valves 141, 142 and 143 connected to a source of pressurized air as indicated by the arrows directed inwardly of these valves and having exhaust ports as indicated by the arrows directed outwardly from the valves. The control valves are pneumatically operated and an air vent line 144 connects the pneumatic switch 136 to one side of the operators or spools of valves 142 and 143. Note that the spools or operators are normally pressurized. The other side of the operator of valve 141 is connected by a line 146 to the pneumatic switch 116 which selectively vents or exhausts this line upon actuation by the actuator 117. This line 146 is also connected to one side of the actuator or slide of valve 143. The other side of the actuators or slides of valve 142 and 143 are connected through a line 147 to the pneumatic switch 76 which selectively vents or exhausts this line upon actuation by the actuator 77. The pneumatic cylinder 66 has the opposite ends thereof connected to the control valve 141, the drive cylinder 56 has the opposite ends thereof connected to the control valve 142 and the upper drive cylinder 81 has the opposite ends thereof connected to the control valve 143.

The electrical control circuit 138 includes an on-off switch 151 connected between a power supply terminal 152 and the foot switch 131. This foot switch 131 is connected to a switch 153 that is controlled by the light sensor 48 and which in turn is connected through a timer operated switch 154 to operate the pneumatic switch 136. The pneumatic switch 136 may, for example, be provided as a solenoid operated valve having the coil connected between the electrical circuit 137 and ground. The switch 153 is operated by the light sensor 48 to close only when the light beam from light source 47 in FIG. 2 is cut off to the sensor, as by the presence of a female button part in the button holder 38. The switch 153 is only initially closed when a female button part is in position and this prevents inadvertent operation of the machinery without proper initial location of the female button part. The timer switch 154 is operated by a delay unit 156 which may, for example, comprise an electronic timer or a motor operated cam unit or the like, for the purpose of providing a time delay between successive quilting operations by the machinery hereof. This delay is preferably adjustable to establish the rate at which successive quilting buttons are driven in order to provide the operator of the equipment with adequate time to move the pad or quilt into proper position to receive the next quilting button. The present invention is adapted to be operated by an operator depressing the foot pedal or the like 31 and maintaining the switch thereof in closed position. The invention will then cycle, i.e., repeatedly drive quilting buttons at a very rapid rate, as noted above.

Operation of the control system of the present invention is relatively straightforward in that initiation of movement of the elements of the present invention with male and female button parts properly located in the button holders is accomplished by applying a signal to the solenoid operated valve 136 to thereby vent the control line 144 and thus to operate control valves 141 and 142 to connect the lower end of drive piston 56 through the valve 142 to high pressure air and to vent the upper end of this drive cylinder and at the same time to connect the lower or left hand end of the cylinder 66 to high pressure air through the control valve 141 and also to vent the opposite end of the cylinder through this same valve. The needle 62 will thus be moved upwardly through the female button part and the slide plate 51 will be driven upwardly until the arm thereon engages the actuator 77 and operates the pneumatic switch 76 to vent the line 147. This causes the control valve 142 to switch connections so as to vent the lower end of the drive cylinder 56 and apply high pressure air to the upper end thereof for withdrawing the needle. The upper drive cylinder 81 is operated by applying high pressure air to the upper end thereof and venting the lower end through the valve 143 which has been operated by the pressure in line 146. As the piston rod 82 drives the male button part through the female button part the arm upon this piston rod engages the actuator 117 and opens the pneumatic switch 116 to vent or exhaust the control line 146. This then reverses the operation of the control valves 141 and 143 so that the lower end of cylinder 181 has high pressure air applied thereto and the upper end is vented and the piston rod 82 is withdrawn upwardly. At the same time the control valve 141 applies high pressure air to the right or upper end of the cylinder 66 and vents the other end of the cylinder so that the piston rod thereof is withdrawn into the cylinder. This then completes one cycle of operation wherein a single quilting button has been driven through a pad and locked therein. The time delay means 156 then opens the switch 154 so as to prevent immediate recycling of the machinery. This time delay is predetermined and may, in fact, be adjustable in order to set the machine to cease operations for some few seconds in order for the operator to move the quilting pad into the next position for application of a quilting button. The switch 153 in the electrical circuitry 38 is opened by the light sensor 48 or circuitry associated therewith until a female button part is appropriate positioned upon the female button holder so that the next quilting button may be applied to the pad. As soon as this female button part is appropriately positioned the switch 153 closes and the cycle is repeated as soon as the time delay has expired so that the switch 154 closes. This then restarts the cycle so that the pneumatic system 137 operates again in the manner discussed above.

It will be appreciated that the present invention provides a relatively simple machine for driving two-part quilting buttons through a pad or quilt and securing these parts together. The automated features of the present invention and the relative simplicity of mechanical motions and precision of button part placement allows very rapid operation of the present invention. It will be noted that a considerable force is required to drive a female button part through at least certain types of pads and the linkage arrangement employed herein employs a mechanical advantage which is highly advantageous in accomplishing the foregoing. Additionally the simplification of button part feed means in the present invention materially increases the rapidity with which the present invention may be operated and the particular provisions herein for aligning the button parts to be locked together ensures a highly professional result.

Although the present invention has been described above with respect to a single preferred embodiment thereof, it will be appreciated by those skilled in the art that numerous modifications and variations are possible so that it is not intended to limit the invention to the precise details of illustration or particular terms of description.

What is claimed is:

1. A quilting machine for rapidly inserting a two-part quilting button having a male and a female button part through a workpiece comprising a male button part holder adapted to receive male button parts contiguously fed thereto and including resiliently displaceable means receiving and holding each successive male button part, a single displacement male button part drive means for forcing a male button part axially thereof into a female button part, a female button part holder adapted to receive successive female button parts fed thereto and including a movable drive member for displacing a female button part toward said male button part holder, and means moving said drive member to drive a female button part through a workpiece and means actuating said male button part drive means for driving a male button part through a female button part that extends through a workpiece.

2. The quilting machine of claim 1 further defined by said male button part holder having said resiliently displaceable means comprised as a pair of spring mounted plates normally disposed in contiguous relation and defining an opening therethrough with a beveled upper edge upon which the head of a male button part is adapted to rest, and a pair of pivotally mounted jaws resiliently urged together beneath said displacement means and defining an opening therebetween with inwardly tapered walls for aligning a male button part driven therethrough by said male button part drive means.

3. The quilting machine of claim 1 further defined by said movable drive member including a slide plate slidably disposed in a track and carrying a drive cylinder having an extensible piston rod with a sharp end directed through an upper end of the slide plate for movement through a female button part disposed atop said slide plate, and means feeding successive female button parts onto said slide plate including a button part track directed to the top of said slide plate in a normal position thereof and having air jet means maintaining successive female button parts in contiguous relation thereto.

4. The quilting machine of claim 1 further defined by said male button part drive means and the means moving said female button part drive member comprising pneumatic cylinders, control valves for selectively operating said pneumatic cylinders, pneumatic switches for changing the setting of said control valves including actuators for at least two of said switches disposed for operation by said drive means and said means moving said female button part drive member, and an electrical circuit including a control switch for operating at least one of said pneumatic switches to initiate operation of the machine which then repeats successive cycles of operation.

5. The quilting machine of claim 4 further defined by delay means energized by said electrical circuit and connected to operate said one pneumatic switch for providing a short period of machine inactivity between successive operations whereby said workpiece may be moved.

6. The quilting machine of claim 4 further defined by a light source and photocell disposed to energize the photocell in the absence of a female button part upon said female button part holder and connected to operate a switch in said electrical circuit for preventing initiation of machine operation in the absence of a female button part upon said female button part holder.

* * * * *